US012610390B2

(12) United States Patent
Zhang et al.

(10) Patent No.: US 12,610,390 B2
(45) Date of Patent: Apr. 21, 2026

(54) DETERMINING A FREQUENCY TO USE IN CELL RESELECTION

(71) Applicants: China Mobile Communication Co., Ltd Research Institute, Beijing (CN); China Mobile Communications Group Co., Ltd., Beijing (CN)

(72) Inventors: Xiaoran Zhang, Beijing (CN); Nan Hu, Beijing (CN); Xiaodong Xu, Beijing (CN); Liang Liu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 422 days.

(21) Appl. No.: 17/793,514

(22) PCT Filed: Jan. 19, 2021

(86) PCT No.: PCT/CN2021/072628
§ 371 (c)(1),
(2) Date: Jul. 18, 2022

(87) PCT Pub. No.: WO2021/143918
PCT Pub. Date: Jul. 22, 2021

(65) Prior Publication Data
US 2023/0072951 A1      Mar. 9, 2023

(30) Foreign Application Priority Data

Jan. 19, 2020    (CN) .......................... 202010057898.1

(51) Int. Cl.
*H04W 36/00*        (2009.01)
*H04W 48/20*        (2009.01)
(Continued)

(52) U.S. Cl.
CPC .......... *H04W 72/56* (2023.01); *H04W 48/20* (2013.01); *H04W 72/0453* (2013.01)

(58) Field of Classification Search
CPC . H04W 72/56; H04W 48/20; H04W 72/0453; H04W 72/563; H04W 8/22;
(Continued)

(56) References Cited

U.S. PATENT DOCUMENTS 9,706,538 B1 *    7/2017   Oroskar ................ H04W 76/30
2014/0242993 A1    8/2014   Dahlen et al.
(Continued)

FOREIGN PATENT DOCUMENTS

CN        103260171 A      8/2013
CN        104995960 A      10/2015
(Continued)

OTHER PUBLICATIONS

Ericsson, "Support for SPID over network interfaces", 3GPP TSG-RAN WG3 Meeting #99bis, R3-182251, Sanya, China, Apr. 16-20, 2018.
(Continued)

*Primary Examiner* — Mewale A Ambaye
(74) *Attorney, Agent, or Firm* — Price Heneveld LLP

(57)        ABSTRACT

Provided are a cell reselection method and a device. The method includes: receiving, from a network device, a frequency priority and one of following: a frequency priority reason corresponding to the frequency priority, or information on whether to apply the frequency priority, or information on a condition to apply the frequency priority, or index information of the frequency priority.

19 Claims, 4 Drawing Sheets

301 sending, to a UE, a frequency priority and one of following: a frequency priority reason corresponding to the frequency priority, or information on whether to apply the frequency priority, or information on a condition to apply the frequency priority, or index information of the frequency priority

(51) Int. Cl.
   *H04W 72/0453*        (2023.01)
   *H04W 72/56*          (2023.01)
(58) Field of Classification Search
   CPC ... H04W 48/18; H04W 48/16; H04W 84/042;
   H04W 36/08
   See application file for complete search history.

(56)                    References Cited

U.S. PATENT DOCUMENTS

| | | | |
|---|---|---|---|
| 2015/0282058 A1 | 10/2015 | Forssell | |
| 2015/0373584 A1* | 12/2015 | Hong .................... | H04W 72/04 |
| | | | 370/329 |
| 2016/0234746 A1 | 8/2016 | Gopal et al. | |
| 2017/0135005 A1 | 5/2017 | Basu Mallick et al. | |
| 2019/0222364 A1* | 7/2019 | Shimoda ................. | H04L 1/189 |
| 2019/0254110 A1* | 8/2019 | He ........................ | H04L 5/0048 |
| 2019/0349774 A1 | 11/2019 | Lou et al. | |
| 2020/0022095 A1* | 1/2020 | Kim ........................ | H04W 8/08 |
| 2020/0120547 A1 | 4/2020 | Han et al. | |
| 2020/0337050 A1 | 10/2020 | Mildh | |
| 2020/0413450 A1* | 12/2020 | Kim .................. | H04W 36/0077 |
| 2021/0092621 A1* | 3/2021 | Shih ...................... | H04W 48/20 |
| 2022/0225189 A1* | 7/2022 | Kang .................. | H04W 36/13 |
| 2024/0089836 A1* | 3/2024 | He .................. | H04W 36/0085 |
| 2024/0214884 A1* | 6/2024 | Kim .................. | H04W 36/0079 |

FOREIGN PATENT DOCUMENTS

| | | | | |
|---|---|---|---|---|
| CN | 106171013 A | 11/2016 | | |
| CN | 107258103 A | 10/2017 | | |
| CN | 108347751 A | 7/2018 | | |
| CN | 108513322 A | 9/2018 | | |
| CN | 109936862 A | 6/2019 | | |
| CN | 110418388 A | 11/2019 | | |
| EP | 2528389 A1 * | 11/2012 | .............. | H04W 8/24 |
| EP | 3417657 A1 * | 12/2018 | ........... | H04W 48/20 |
| EP | 3627863 A1 | 3/2020 | | |
| EP | 3417657 B1 | 11/2020 | | |
| JP | 2011061456 A | 3/2011 | | |
| JP | 2020535692 A | 12/2020 | | |
| WO | 2009045078 A2 | 4/2009 | | |
| WO | 2017140342 A1 | 8/2017 | | |
| WO | 2018228294 A1 | 12/2018 | | |
| WO | 2019064274 A1 | 4/2019 | | |

OTHER PUBLICATIONS

Qualcomm Inc., "Idle Mode cell reselection based on CN type supported", 3GPP TSG-RAN WG2 Meeting #108, R2-1914789, Reno, USA, Nov. 18-22, 2019.

* cited by examiner

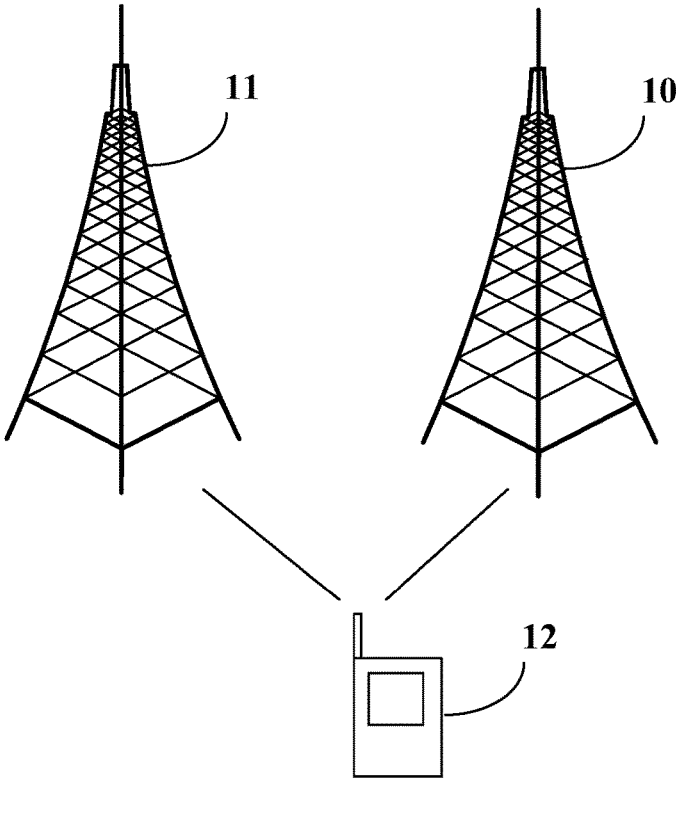

Fig. 1

201 receiving, from a network device, a frequency priority and one of following: a frequency priority reason corresponding to the frequency priority, or information on whether to apply the frequency priority, or information on a condition to apply the frequency priority, or index information of the frequency priority

Fig. 2

301 sending, to a UE, a frequency priority and one of following: a frequency priority reason corresponding to the frequency priority, or information on whether to apply the frequency priority, or information on a condition to apply the frequency priority, or index information of the frequency priority

DETERMINING A FREQUENCY TO USE IN CELL RESELECTION

CROSS-REFERENCE TO RELATED APPLICATION

The present application is the U.S. national phase of PCT Application No. PCT/CN2021/072628 filed on Jan. 19, 2021, which claims a priority of the Chinese patent application 202010057898.1 filed on Jan. 19, 2020, which are incorporated herein by reference in their entirety.

TECHNICAL FIELD

Embodiments of the present disclosure relate to the field of communication technology, in particular to a cell reselection method and a device.

BACKGROUND

A User Equipment (UE) in an idle state performs cell reselection by selecting, according to a frequency priority configured by a network, a frequency to camp on preferentially. There are two ways of configuring the frequency priority:
(1) broadcasting the frequency priority by using a system message, wherein the broadcasted frequency priority is the same for all UEs in the cell, and is not UE-specific;
(2) configuring the frequency priority by using a dedicated signaling (e.g., a Radio Resource Control (RRC) release message).

In the era of the fourth Generation (4G), a dedicated frequency priority is mainly adopted for load balancing of the network, that is, for offloading UEs to a less busy carrier. In the era of $5^{th}$ Generation (5G), with diversified UE types and diversified services supported by UE, the dedicated frequency priority has found more diverse and flexible usages.

For example, the concept of slice is introduced in 5G. A single UE may support services of multiple slices, a cell may support services of multiple slices as well, and the UE can only access a cell of a slice supported by the UE itself. According to the related art, a network configures, according to the slice supported by the UE, a dedicated frequency priority for the UE (e.g., elevate the priority level of the frequency supporting the slice). According to the conventional protocol, if a UE moves into another cell, the UE will continue using the dedicated frequency priority. However, the other cell may not support the slice. Thus, the dedicated frequency priority may not serve its intended purpose at this time, and sticking to the dedicated frequency priority may incur network load imbalance.

For another example, in a multi-radio access technology dual connectivity (Multi-Radio access technology Dual Connectivity, MR-DC) scenario, e.g., an Evolved Universal Terrestrial Radio Access-New Radio Dual Connectivity (E-UTRA-NR Dual Connectivity, EN-DC) scenario, both 5G UEs in an idle state and 4G UEs in an idle state camp on a 4G Long Term Evolution (LTE) network, but the network may configure, for EN-DC UEs, a different dedicated frequency priority than that of LTE UEs (e.g., elevate the priority level of the LTE carrier frequency supporting the EN-DC). According to the conventional protocol, if an EN-DC UE moves into another cell, the EN-DC UE will continue using the dedicated frequency priority. However, the other cell may lack 5G coverage. Thus, the UE cannot operate in 5G mode at this time even if the dedicated frequency priority is used, and sticking to the dedicated frequency priority may incur network load imbalance.

It can be seen from the above, the configured frequency priority cannot afford the flexibility of multiple UE types and multiple kinds of services.

SUMMARY

Embodiments of the present disclosure provide a cell reselection method and a device, to solve the problem that the configured frequency priority cannot afford the flexibility of multiple UE types and multiple kinds of services.

In a first aspect, some embodiments of the present disclosure provide a cell reselection method, which is performed by a UE, the cell reselection method including:
receiving, from a network device, a frequency priority and one of following: a frequency priority reason corresponding to the frequency priority, or information on whether to apply the frequency priority, or information on a condition to apply the frequency priority, or index information of the frequency priority;
wherein the frequency priority and one of the following: the frequency priority reason, or the information on whether to apply the frequency priority, or the condition to apply the frequency priority, or the index information of the frequency priority are used for a cell reselection.

Optionally, the method further includes:
determining a frequency priority to use in the cell reselection, based on capability information of the UE and/or information sent by the network device, and one of the following: the frequency priority reason, or the information on whether to apply the frequency priority, or the information on the condition to apply the frequency priority, or the index information of the frequency priority.

Optionally, the information indicates one or more of following:
whether a serving cell and/or a neighbor cell supports Multi-Radio access technology Dual Connectivity (MR-DC);
slice(s) supported by the serving cell and/or the neighbor cell;
whether the serving cell and/or the neighbor cell supports a preset dedicated network;
type(s) of dedicated network(s) supported by the serving cell and/or the neighbor cell.

Optionally, the determining the frequency priority to use in the cell reselection, based on the capability information of the UE and/or the information sent by the network device, and one of the following: the frequency priority reason, or the information on whether to apply the frequency priority, or the information on the condition to apply the frequency priority, or the index information of the frequency priority includes one or more of following:
in case that the frequency priority reason, or the information on whether to apply the frequency priority, or the information on the condition to apply the frequency priority, or the index information of the frequency priority denotes information on a frequency priority adopted by the UE, determining that a frequency priority corresponding to the information on the frequency priority adopted by the UE is the frequency priority to use in the cell reselection;
in case that the frequency priority reason or the information on the condition to apply the frequency priority denotes MR-DC, the information indicating that MR- DC is supported by the serving cell and/or the neighbor cell is received by the UE, and the UE supports the MR-DC, determining that a frequency priority corresponding to the MR-DC is the frequency priority to use in the cell reselection;

in case that the frequency priority reason or the information on the condition to apply the frequency priority denotes slice(s), the slice(s) supported by the serving cell and/or the neighbor cell is received by the UE, and the UE supports the slice(s) or is about to initiate a service related to the slice(s), determining that a frequency priority corresponding to the slice(s) is the frequency priority to use in the cell reselection;

in case that the frequency priority reason or the information on the condition to apply the frequency priority denotes a preset dedicated network, the information indicating that the preset dedicated network is supported by the serving cell and/or the neighbor cell is received by the UE or the type(s) of the dedicated network(s) supported by the serving cell and/or the neighbor cell is received by the UE, and the UE is in the preset dedicated network, determining that a frequency priority corresponding to the preset dedicated network is the frequency priority to use in the cell reselection;

in case that the frequency priority reason or the information on the condition to apply the frequency priority denotes load balancing or default, the slice(s) supported by the serving cell and/or the neighbor cell is received by the UE, and the UE does not support the slice(s), determining that a frequency priority corresponding to the load balancing or default is the frequency priority to use in the cell reselection;

in case that the frequency priority reason or the information on the condition to apply the frequency priority denotes the load balancing or default, the information indicating that MR-DC is supported by the serving cell and/or the neighbor cell is received by the UE, and the UE does not support the MR-DC, determining that the frequency priority corresponding to the load balancing or default is the frequency priority to use in the cell reselection;

in case that the frequency priority reason or the information on the condition to apply the frequency priority denotes the load balancing or default, and the information is not received by the UE, determining that the frequency priority corresponding to the load balancing or default is the frequency priority to use in the cell reselection.

Optionally, the method further includes:

in case that frequency priority activation information sent by the network device is received, determining the frequency priority to use in the cell reselection based on the frequency priority activation information and one of the following: the frequency priority reason, or the information on whether to apply the frequency priority, or the information on the condition to apply the frequency priority, or the index information of the frequency priority;

in case that the frequency priority activation information sent by the network device is not received, using a default frequency priority as the frequency priority to use in the cell reselection.

Optionally, the receiving, from the network device, the frequency priority and one of the following: the frequency priority reason corresponding to the frequency priority, or the information on whether to apply the frequency priority, or the information on the condition to apply the frequency priority, or the index information of the frequency priority includes:

receiving, from the network device, through a broadcast message or dedicated signaling, the frequency priority and one of the following: the frequency priority reason corresponding to the frequency priority, or the information on whether to apply the frequency priority, or the information on the condition to apply the frequency priority, or the index information of the frequency priority.

Optionally, the method further includes:

receiving, from the network device, an effective duration of the frequency priority;

in case that a condition for determining that the frequency priority is the frequency priority to use in the cell reselection is not met, suspending the frequency priority before the effective duration of the frequency priority expires or before a new frequency priority is received.

Optionally, the method further includes:

sending capability information of the UE to the network device, wherein the capability information of the UE includes one or more of following:

information of slice(s) supported by the UE;

an MR-DC frequency band combination supported by the UE.

In a second aspect, some embodiments of the present disclosure further provide a cell reselection method, which is performed by a network device, the cell reselection method including:

sending, to a UE, a frequency priority and one of following: a frequency priority reason corresponding to the frequency priority, or information on whether to apply the frequency priority, or information on a condition to apply the frequency priority, or index information of the frequency priority;

wherein the frequency priority and one of the following: the frequency priority reason, or the information on whether to apply the frequency priority, or the condition to apply the frequency priority, or the index information of the frequency priority are used for a cell reselection.

Optionally, the sending, to the UE, the frequency priority and one of the following: the frequency priority reason corresponding to the frequency priority, or the information on whether to apply the frequency priority, or the information on the condition to apply the frequency priority, or the index information of the frequency priority includes:

sending, to the UE, through a broadcast message or dedicated signaling, the frequency priority and one of the following: the frequency priority reason corresponding to the frequency priority, or the information on whether to apply the frequency priority, or the information on the condition to apply the frequency priority, or the index information of the frequency priority.

In a third aspect, some embodiments of the present disclosure further provide a UE, including:

a first receiving module, configured to receive, from a network device, a frequency priority and one of following: a frequency priority reason corresponding to the frequency priority, or information on whether to apply the frequency priority, or information on a condition to apply the frequency priority, or index information of the frequency priority;

wherein the frequency priority and one of the following: the frequency priority reason, or the information on whether to apply the frequency priority, or the condition to apply the frequency priority, or the index information of the frequency priority are used for a cell reselection.

In a fourth aspect, some embodiments of the present disclosure further provide a UE, including: a first transceiver and a first processor, wherein the first transceiver is configured to receive, from a network device, a frequency priority and one of following: a frequency priority reason corresponding to the frequency priority, or information on whether to apply the frequency priority, or information on a condition to apply the frequency priority, or index information of the frequency priority;

wherein the frequency priority and one of the following: the frequency priority reason, or the information on whether to apply the frequency priority, or the condition to apply the frequency priority, or the index information of the frequency priority are used for a cell reselection.

In a fifth aspect, some embodiments of the present disclosure further provide a network device, including:

a second sending module, configured to send, to a UE, a frequency priority and one of following: a frequency priority reason corresponding to the frequency priority, or information on whether to apply the frequency priority, or information on a condition to apply the frequency priority, or index information of the frequency priority;

wherein the frequency priority and one of the following: the frequency priority reason, or the information on whether to apply the frequency priority, or the condition to apply the frequency priority, or the index information of the frequency priority are used for a cell reselection.

In a sixth aspect, some embodiments of the present disclosure further provide a network device, including: a second processor and a second transceiver, wherein the second transceiver is configured to send, to a UE, a frequency priority and one of following: a frequency priority reason corresponding to the frequency priority, or information on whether to apply the frequency priority, or information on a condition to apply the frequency priority, or index information of the frequency priority;

wherein the frequency priority and one of the following: the frequency priority reason, or the information on whether to apply the frequency priority, or the condition to apply the frequency priority, or the index information of the frequency priority are used for a cell reselection.

In a seventh aspect, some embodiments of the present disclosure further provide a communication device, including a processor, a memory and a program stored in the memory and configured to be executed by the processor, wherein the processor is configured to execute the program, to implement steps of the cell reselection method as described in the first or second aspect.

In an eighth aspect, some embodiments of the present disclosure further provide a computer readable storage medium storing thereon a computer program, wherein the computer program is configured to be executed by a processor, to implement steps of the cell reselection method as described in the first or second aspect.

In some embodiments of the present disclosure, based on the frequency priority reason, or the information on whether to apply the frequency priority, or the condition to apply the frequency priority, or the index information, a suitable frequency priority may be selected to use in cell reselection, so as to achieve the flexibility of multiple UE types (e.g., 5G UE) and multiple kinds of services.

BRIEF DESCRIPTION OF THE DRAWINGS

Having read detailed description of optional implementations of the present disclosure set forth below, a person of ordinary skill in the art would easily recognize various additional advantages and benefits. The accompanying drawings are merely for the purpose of illustrating optional implementations of the present disclosure, and are not intended to be construed as a limitation on the present disclosure. The same reference character is used to designate identical components throughout the drawings. In the drawings:

FIG. 1 is a schematic diagram of an architecture of a wireless communication system;

FIG. 2 is a flow diagram of a cell reselection method according to some embodiments of the present disclosure;

FIG. 3 is another flow diagram of a cell reselection method according to some embodiments of the present disclosure;

DETAILED DESCRIPTION

Figure 4:
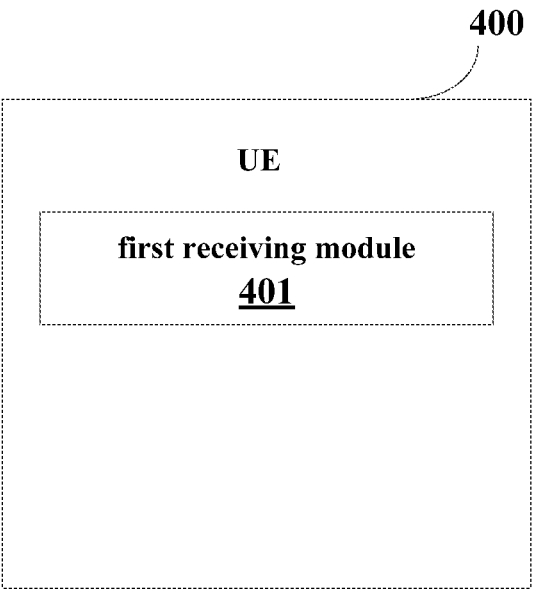
FIG. 4 is a schematic diagram of UE according to some embodiments of the present disclosure.

In the following, technical solutions in embodiments of the present disclosure will be described in a clear and complete manner with reference to the drawings related to the embodiments. Obviously, the described embodiments are merely a part of, rather than all of, the embodiments of the present disclosure. Based on the embodiments of the present disclosure, a person skilled in the art may, without any creative effort, obtain other embodiments, which also fall within the scope of the present disclosure.

Terms "include", "comprise" and any variant thereof in the description and claims of the present disclosure are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment. In addition, the term "and/or" as used in the description and claims refers to at least one of objects connected by the term. For example, A and/or B may represent three possibilities: only A exists, only B exists, and both A and B exist.

In embodiments of the present disclosure, the word "exemplary" or "for example" or the like is used for meaning examples, example illustration or illustration. Any embodiment or design solution described as "exemplary" or "for example" in the embodiments of the present application should not be construed as being more preferred or advantageous than other embodiments or design solutions. To be specific, the word "exemplary" or "for example" or the like is intended to present related concepts in a specific manner.

Techniques described herein are not limited to $5^{th}$ Generation (5G) systems and subsequent evolved communication systems, and are not limited to LTE/LTE-Advanced (LTE-A) systems. They can be utilized in various wireless communication systems, such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA) and other systems.

The terms "system" and "network" are often interchangeable herein. A CDMA system can implement radio technologies such as CDMA2000 or Universal Terrestrial Radio Access (UTRA). UTRA includes Wideband Code Division Multiple Access (WCDMA) and other CDMA variants. A TDMA system can implement radio technologies such as Global System for Mobile communication (GSM). An OFDMA system can implement radio technologies such as Ultra Mobile Broadband (UMB), Evolved UTRA (E-UTRA), IEEE 802.11 (Wi-Fi), IEEE 802.16 (WiMAX), IEEE 802.20, or Flash-OFDM. Both UTRA and E-UTRA are a part of Universal Mobile Telecommunication System (UMTS). LTE and more advanced LTE (e.g., LTE-A) are new UMTS versions using E-UTRA. UTRA, E-UTRA, UMTS, LTE, LTE-A and GSM are described in the literatures of an organization named "$3^{rd}$ Generation Partnership Project (3GPP)". CDMA2000 and UMB are described in the literatures of an organization named "$3^{rd}$ Generation Partnership Project 2 (3GPP2)". Techniques described herein can be used in the aforementioned systems and radio technologies, and can be used in other systems and radio technologies as well.

Embodiments of the present disclosure are described hereinafter with reference to the drawings. A cell reselection method and a device provided by some embodiments of the present disclosure may be applied to a wireless communication system. Referring to FIG. 1, a schematic diagram of an architecture of a wireless communication system provided by some embodiments of the present disclosure is illustrated. As shown in FIG. 1, the wireless communication system may include: a first network device 10, a second network device 11 and user equipment 12. The user equipment 12 may be labeled as UE 12. The UE 12 may communicate with the first network device 10 and the second network device 11 (transmit signaling or data). In a practical application, a connection between aforementioned devices may be a wireless connection, which is depicted with solid lines in FIG. 1 to intuitively show the connection relationship between various devices.

The first network device 10 and the second network device 11 provided by some embodiments of the present disclosure may be a base station. The base station may be a commonly used base station, an evolved Node Base station (eNB), a network device in 5G systems (e.g., next Generation Node Base station (gNB)), or a Transmission and Reception Point (TRP).

The UE 12 provided by some embodiments of the present disclosure may be a cellphone, a tablet computer, a notebook computer, an Ultra-Mobile Personal Computer (UMPC), a netbook or Personal Digital Assistant (PDA), a Mobile Internet Device (MID), a wearable device, a vehicle-mounted device or the like.

Referring to FIG. 2, some embodiments of the present disclosure provide a cell reselection method, which may be implemented by UE. The method includes a step 201.

Step 201: receiving, from a network device, a frequency priority and one of following: a frequency priority reason corresponding to the frequency priority, or information on whether to apply the frequency priority, or information on a condition to apply the frequency priority, or index information of the frequency priority;

wherein, the frequency priority and one of the following: the frequency priority reason, or the information on whether to apply the frequency priority, or the condition to apply the frequency priority, or the index information of the frequency priority are used for a cell reselection.

In some embodiments of the present disclosure, the frequency priority is used for representing a priority degree for UE to perform cell reselection by using a certain frequency. For example, content of the frequency priority may include: one or more frequencies and priority levels thereof, wherein the priority levels may be represented by numerical values, e.g., the greater the numerical value, the higher the priority level is, and the lesser the numerical value, the lower the priority level is.

For example, the frequency priority may include: a frequency of 1.8 GHz has a priority level of 2 (higher), and a frequency of 1.9 GHz has a priority level of 1 (lower), that is, the frequency of 1.8 GHz is preferentially used in the cell reselection. For another example, the frequency priority may include: a frequency of 4.9 GHz has a priority level of 2 (higher), and a frequency of 2.6 GHz has a priority level of 1 (lower), that is, the frequency of 4.9 GHz is preferentially used in the cell reselection.

It is noted, the above content of frequency priority is merely for exemplary purpose, and the content of the frequency priority is not specifically limited in some embodiments of the present disclosure.

In some embodiments of the present disclosure, the frequency priority reason is used for representing a reason for configuring the frequency priority, e.g., load balancing, slice or MR-DC, etc.

In some embodiments of the present disclosure, the information on whether to apply the frequency priority is used for representing information related to whether to apply the frequency priority, e.g., load balancing, slice or MR-DC, etc.

In some embodiments of the present disclosure, the condition to apply the frequency priority is used for representing a condition for whether to apply the frequency priority, e.g., load balancing, slice or MR-DC, etc.

In some embodiments of the present disclosure, the index information of the frequency priority is used for representing an identifier of the frequency priority. For example, a frequency f1 has a priority level of 1 and a frequency f2 has a priority level of 2, corresponding index information of the frequency priority is an index 0; a frequency f1 has a priority level of 2 and a frequency f2 has a priority level of 1, corresponding index information of the frequency priority is an index 1.

In some embodiments of the present disclosure, optionally, the frequency priority and one of the following: the frequency priority reason corresponding to the frequency priority, or the information on whether to apply the frequency priority, or the information on the condition to apply the frequency priority, or the index information of the frequency priority are received from the network device through a system message or dedicated signaling.

In some embodiments of the present disclosure, if the frequency priority and one of the following: the frequency priority reason corresponding to the frequency priority, or the information on whether to apply the frequency priority, or the information on the condition to apply the frequency priority, or the index information of the frequency priority are received through a broadcasted system message, then the condition for performing the cell reselection based on the frequency priority further includes: a cell which the UE camps on remains unchanged.

Further, when the UE moves into another cell, i.e., the cell which the UE camps on changes, the broadcasted frequency priority is not applicable, and the UE reads a frequency priority in a system message of the newly camped cell and performs the cell reselection based on the frequency priority.

In some embodiments of the present disclosure, one piece of information among following information: the frequency priority reason, or the information on whether to apply the frequency priority, or the information on the condition to apply the frequency priority, or the index information may correspond to one or more frequency priorities. If the frequency priority reason is satisfied, the UE may use a frequency priority configured based on the frequency priority reason.

For example, the frequency priority reason, or the information on whether to apply the frequency priority, or the information on the condition to apply the frequency priority may include one or more of following items:

(1) load balancing;

the frequency priority is configured considering load balancing of the network; for example, the network sets a priority level of a time-division duplex (TDD) frequency with a relatively larger bandwidth higher, to support more UEs, thereby achieving load balancing;

(2) slice type(s) (or slice(s) for short) supported by the UE;

the frequency priority is configured considering the slice type(s) supported by the UE; for example, UE supports Ultra Reliable & Low Latency Communication (URLLC) slice service, and the network sets a priority level of a frequency supporting the URLLC slice service higher, so that the UE preferentially camps on the frequency supporting the URLLC slice service;

(3) an MR-DC frequency band combination deployed by network and/or an MR-DC frequency band combination supported by UE (or MR-DC for short);

the frequency priority is configured considering the MR-DC frequency band combination deployed by network and the MR-DC frequency band combination supported by UE; for example, a network deploys an NSA frequency band combination of LTE 1.8 GHz+NR 2.6 GHz, and UE also supports this MR-DC frequency band combination, then the network sets a priority level of the LTE frequency of 1.8 GHz higher, so that the MR-DC UE preferentially camps on the frequency of 1.8 GHz; if the UE preferentially camped on another frequency, then after entering a connected state, the UE could not configure MR-DC until it switches to the frequency of 1.8 GHz, thereby causing additional switching overhead and latency.

For example, a frequency of 2.6 GHz has a priority level of 2 (higher), a frequency of 4.9 GHz has a priority level of 1 (lower), and the frequency priority reason is load balancing.

For another example, a frequency of 4.9 GHz has a priority level of 2 (higher), a frequency of 2.6 GHz has a priority level of 1 (lower), and the frequency priority reason is slice.

For yet another example, a frequency of 1.8 GHz has a priority level of 2 (higher), a frequency of 1.9 GHz has a priority level of 1 (lower), and the frequency priority reason is MR-DC.

In some embodiments of the present disclosure, the method shown in FIG. 2 may further include: determining a frequency priority to use in the cell reselection, based on capability information of the UE and/or information sent by the network device, and one of the following: the frequency priority reason, or the information on whether to apply the frequency priority, or the information on the condition to apply the frequency priority, or the index information of the frequency priority.

Optionally, the indication information may indicate one or more of following: (1) whether a serving cell and/or a neighbor cell supports MR-DC; (2) slice(s) supported by the serving cell and/or the neighbor cell; (3) whether the serving cell and/or the neighbor cell supports a preset dedicated network; (4) type(s) of dedicated network(s) supported by the serving cell and/or the neighbor cell; (5) information on the frequency priority adopted by the UE.

Manners of determining the frequency priority to use in the cell reselection are described hereinafter.

Manner 1: in case that the frequency priority reason, or the information on whether to apply the frequency priority, or the information on the condition to apply the frequency priority, or the index information of the frequency priority denotes information on a frequency priority adopted by the UE, determining that a frequency priority corresponding to the information on the frequency priority adopted by the UE is the frequency priority to use in the cell reselection.

The information on the frequency priority adopted by the UE specifically includes: the information on the frequency priority may indicate to the UE which frequency priority to use in the cell reselection when the network configures multiple frequency priorities through broadcast or dedicated signaling.

Manner 2: in case that the frequency priority reason or the information on the condition to apply the frequency priority denotes slice(s), the slice(s) supported by the serving cell and/or the neighbor cell is received by the UE, and the UE supports the slice(s) or is about to initiate a service related to the slice(s), determining that a frequency priority corresponding to the slice(s) is the frequency priority to use in the cell reselection.

Manner 3: in case that the frequency priority reason or the information on the condition to apply the frequency priority denotes a preset dedicated network, the information indicating that the preset dedicated network is supported by the serving cell and/or the neighbor cell is received by the UE or the type(s) of the dedicated network(s) supported by the serving cell and/or the neighbor cell is received by the UE, and the UE is in the preset dedicated network, determining that a frequency priority corresponding to the preset dedicated network is the frequency priority to use in the cell reselection.

Manner 4: in case that the frequency priority reason or the information on the condition to apply the frequency priority denotes load balancing or default, the slice(s) supported by the serving cell and/or the neighbor cell is received by the UE, and the UE does not support the slice(s), determining that a frequency priority corresponding to the load balancing or default is the frequency priority to use in the cell reselection.

Manner 5: in case that the frequency priority reason or the information on the condition to apply the frequency priority denotes the load balancing or default, the information indicating that MR-DC is supported by the serving cell and/or the neighbor cell is received by the UE, and the UE does not support the MR-DC, determining that the frequency priority corresponding to the load balancing or default is the frequency priority to use in the cell reselection.

Manner 6: in case that the frequency priority reason or the information on the condition to apply the frequency priority denotes the load balancing or default, and the information is not received by the UE, determining that the frequency priority corresponding to the load balancing or default is the frequency priority to use in the cell reselection.

In some embodiments of the present disclosure, according to whether frequency priority activation information sent by a network device is received by the UE, different modes may be used to determine the frequency priority to use in the cell reselection.

Mode 1: in case that the frequency priority activation information sent by the network device is received, determining the frequency priority to use in the cell reselection based on the frequency priority activation information and one of the following: the frequency priority reason, or the information on whether to apply the frequency priority, or the information on the condition to apply the frequency priority, or the index information of the frequency priority;

for example, in a step A: UE receives a frequency priority and the index information of the frequency priority sent by the network; e.g., a frequency f1 has a priority level of 1 and a frequency f2 has a priority level of 2, corresponding index information of the frequency priority is an index 0; a frequency f1 has a priority level of 2 and a frequency f2 has a priority level of 1, corresponding index information of the frequency priority is an index 1; in a step B: the UE receives the frequency priority activation information sent by the network; e.g., the received frequency priority activation information being index 1 denotes that the UE adopts the frequency priority with the index 1 as the frequency priority to use in the cell reselection, i.e., (the frequency f1 has a priority level of 2 and the frequency f2 has a priority level of 1).

Mode 2: in case that the frequency priority activation information sent by the network device is not received, using a default frequency priority as the frequency priority to use in the cell reselection;

for example, in a step A: UE receives a frequency priority and the index information of the frequency priority sent by the network; e.g., a frequency f1 has a priority level of 1 and a frequency f2 has a priority level of 2, corresponding index information of the frequency priority is an index 0; in a step B: if the UE fails to receive the frequency priority activation information sent by the network, the UE uses a default frequency priority as the frequency priority to use in the cell reselection.

In some embodiments of the present disclosure, the method shown in FIG. 2 may further include: receiving, from the network device, slice information, wherein the slice information includes information on slice(s) supported by one or more frequencies or cells.

For example, the slice information may include: 4.9 GHz supports URLLC slice, 2.6 GHz supports enhanced Mobile Broad Band (eMBB) slice. Alternatively, the slice information may include: 4.9 GHz supports URLLC slice.

It is understood, the aforementioned one or more cells include a serving cell and/or a neighbor cell.

In some embodiments of the present disclosure, the method shown in FIG. 2 may further include: receiving, from the network device, MR-DC information of one or more cells;

wherein, the MR-DC information includes one or more of the following:

(1) whether the one or more cells support a configured wireless communication technology (e.g., 5G) or MR-DC;

(2) frequency (frequencies) of other RAT(s) of the MR-DC supported by the one or more cells;

(3) frequency band combination(s) of the MR-DC supported by the one or more cells.

It is understood, the aforementioned one or more cells include a serving cell and/or a neighbor cell.

In some embodiments of the present disclosure, the method shown in FIG. 2 may further include: receiving, from the network device, an effective duration of the frequency priority; and in case that a condition for determining that the frequency priority is the frequency priority to use in the cell reselection is not met, suspending the frequency priority before the effective duration of the frequency priority expires or before a new frequency priority is received.

The effective duration may be a time point or a time period. For example, that the effective duration of the frequency priority does not expire represents the frequency priority may be used; that the effective duration of the frequency priority expires represents the frequency priority cannot be used. For example, a frequency priority configured through a dedicated signaling has an effective duration; when the time is within the effective duration, the UE uses the frequency priority in the dedicated signaling to perform cell reselection; when the effective duration has passed, the frequency priority in the dedicated signaling is not applicable, and the UE uses the frequency priority in the broadcasted system message to perform cell reselection.

In some embodiments of the present disclosure, the method shown in FIG. 2 may further include: prior to receiving the frequency priority and the frequency priority reason from the network device, sending information of the UE to the network device, wherein the information of the UE includes one or more of following:

(1) information of slice(s) supported by the UE, e.g., a list of slices supported by the UE;

(2) an MR-DC frequency band combination supported by the UE.

In some embodiments of the present disclosure, based on the frequency priority reason, or the information on whether to apply the frequency priority, or the condition to apply the frequency priority, or the index information, a suitable frequency priority may be selected to use in cell reselection, so as to achieve the flexibility of multiple UE types (e.g., 5G UE) and multiple kinds of services.

In some embodiments of the present disclosure, based on the frequency priority reason, or the information on whether to apply the frequency priority, or the condition to apply the frequency priority, or the index information, a suitable frequency priority may be selected to use in cell reselection, so as to achieve the flexibility of multiple UE types (e.g., 5G UE) and multiple kinds of services.

Referring to FIG. 3, some embodiments of the present disclosure further provide a cell reselection method, which may be implemented by a network device. The method includes a step 301.

Step 301: sending, to a UE, a frequency priority and one of following: a frequency priority reason corresponding to the frequency priority, or information on whether to apply the frequency priority, or information on a condition to apply the frequency priority, or index information of the frequency priority;

wherein, the frequency priority and one of the following: the frequency priority reason, or the information on whether to apply the frequency priority, or the condition to apply the frequency priority, or the index information of the frequency priority are used for a cell reselection.

For example, the frequency priority and one of the following: the frequency priority reason corresponding to the frequency priority, or the information on whether to apply the frequency priority, or the information on the condition to apply the frequency priority, or the index information of the frequency priority are sent to the UE through a broadcast message or dedicated signaling.

In some embodiments of the present disclosure, the method shown in FIG. 3 may further include: sending, to the UE, indication information, wherein the information indicates one or more of following:

whether a serving cell and/or a neighbor cell supports MR-DC;

slice(s) supported by the serving cell and/or the neighbor cell;

whether the serving cell and/or the neighbor cell supports a preset dedicated network;

type(s) of dedicated network(s) supported by the serving cell and/or the neighbor cell;

information on the frequency priority adopted by the UE.

In some embodiments of the present disclosure, the method shown in FIG. 3 may further include: sending, to the UE, slice information, wherein the slice information includes information on slice(s) supported by one or more frequencies or cells.

In some embodiments of the present disclosure, the method shown in FIG. 3 may further include: sending, to the UE, MR-DC information of one or more cells;

wherein, the MR-DC information includes one or more of the following:

(1) whether the one or more cells support 5G or MR-DC;

(2) frequency (frequencies) of other RAT(s) of the MR-DC supported by the one or more cells;

(3) frequency band combination(s) of the MR-DC supported by the one or more cells.

In some embodiments of the present disclosure, the method shown in FIG. 3 may further include: sending, to the UE, an effective duration of the frequency priority.

In some embodiments of the present disclosure, the method shown in FIG. 3 may further include: receiving information of the UE, wherein the information of the UE includes one or more of following:

(1) information of slice(s) supported by the UE;

(2) an MR-DC frequency band combination supported by the UE.

In some embodiments of the present disclosure, based on the frequency priority reason, related information of the cell, related information of the UE, a suitable frequency priority may be selected to use in cell reselection, so as to achieve the flexibility of multiple UE types (e.g., 5G UE) and multiple kinds of services.

Hereinafter, cell reselection processes according to some embodiments of the present disclosure are described in conjunction with example 1, example 2, example 3 and example 4.

Example 1

A network sends a frequency priority through a dedicated signaling, wherein the frequency priority includes: a frequency of 4.9 GHz has a priority level of 2 (higher), and a frequency of 2.6 GHz has a priority level of 1 (lower); the frequency priority reason includes: slice(s) supported by UE.

The slice information sent by the network includes: 4.9 GHz supports URLLC slice, 2.6 GHz supports eMBB slice.

A UE supporting URLLC uses the frequency priority sent through the dedicated signaling to perform cell reselection.

If the URLLC UE moves into another cell, and slice information of the other cell sent by the other cell includes: both 4.9 GHz and 2.6 GHz support eMBB service (the slice information of the other cell does not include the slice supported by the UE), then the URLLC UE discovers that the slice information in the other cell does not include the slice supported by the UE, and the URLLC UE does not perform cell reselection by using the frequency priority sent by the network through the dedicated signaling and performs cell reselection by using a frequency priority in a broadcast message.

Example 2

A network sends a frequency priority through a dedicated signaling, wherein the frequency priority includes: a frequency of 4.9 GHz has a priority level of 2 (higher), and a frequency of 2.6 GHz has a priority level of 1 (lower); the frequency priority reason includes: slice(s) supported by UE.

The slice information sent by the network includes: 4.9 GHz supports URLLC slice, 2.6 GHz supports eMBB slice.

A UE supporting URLLC uses the frequency priority sent through the dedicated signaling to perform cell reselection.

If the URLLC UE moves into another cell, the slice information of the other cell sent by the other cell includes: both 4.9 GHz and 2.6 GHz support eMBB service, and slice information of a neighbor cell sent by the other cell includes: 4.9 GHz supports URLLC slice, 2.6 GHz supports eMBB slice, then the URLLC UE discovers that the slice information includes URLLC slice and continues using the frequency priority sent by the network through the dedicated signaling to perform cell reselection.

Example 3

A network sends a frequency priority through a dedicated signaling, wherein the frequency priority includes: a frequency of 1.8 GHz has a priority level of 2 (higher), and a frequency of 1.9 GHz has a priority level of 1 (lower); the frequency priority reason includes: an MR-DC frequency band combination deployed by network and/or an MR-DC frequency band combination supported by UE.

The network sends MR-DC information, which includes: 5G or MR-DC is supported and the supported MR-DC frequency band combination is 1.8 GHz (LTE)+2.6 GHz (NR).

If a UE supporting the 1.8 GHz (LTE)+2.6 GHz (NR) MR-DC detects that both a measurement result of 1.8 GHz LTE and a measurement result of 2.6 GHz LTE exceed a certain threshold, the UE uses the frequency priority sent through the dedicated signaling to perform cell reselection.

If the UE moves into another cell, and MR-DC information of the other cell includes: 5G or MR-DC is not supported, then the UE uses a frequency priority in a broadcast message to perform cell reselection.

Example 4

A network sends, by using a broadcast message, a first frequency priority which includes: a frequency of 4.9 GHz has a priority level of 2 (higher), and a frequency of 2.6 GHz has a priority level of 1 (lower); the frequency priority reason includes: slice(s) supported by UE; meanwhile, the network sends a second frequency priority which includes: a frequency of 2.6 GHz has a priority level of 2 (higher), and a frequency of 4.9 GHz has a priority level of 1 (lower); the frequency priority reason is load balancing.

The slice information sent by the network includes: 4.9 GHz supports URLLC slice.

A UE supporting URLLC uses a frequency priority whose frequency priority reason is slice(s) supported by the UE to perform cell reselection, e.g., selects 4.9 GHz for cell reselection.

A regular UE not supporting URLLC uses a frequency priority whose frequency priority reason is load balancing to perform cell reselection, e.g., selects 2.6 GHz for cell reselection.

When the UE moves into another cell, i.e., the cell which the UE camps on changes, the broadcasted frequency priority is not applicable, and the UE reads a frequency priority in a system message of the newly camped cell and performs the cell reselection based on the frequency priority.

If the URLLC UE discovers that the slice information in the other cell does not include the slice supported by the UE, then the URLLC UE does not perform cell reselection by using the frequency priority sent through the dedicated signaling, but performs cell reselection by using a frequency priority in a broadcast message.

Referring to FIG. 4, some embodiments of the present disclosure further provide a UE. The UE 400 includes:

a first receiving module 401, configured to receive, from a network device, a frequency priority and one of following: a frequency priority reason corresponding to the frequency priority, or information on whether to apply the frequency priority, or information on a condition to apply the frequency priority, or index information of the frequency priority;

wherein, the frequency priority and one of the following: the frequency priority reason, or the information on whether to apply the frequency priority, or the condition to apply the frequency priority, or the index information of the frequency priority are used for a cell reselection.

In some implementations, the UE 400 further includes: a first determination module, configured to determine a frequency priority to use in the cell reselection, based on capability information of the UE and/or information sent by the network device, and one of the following: the frequency priority reason, or the information on whether to apply the frequency priority, or the information on the condition to apply the frequency priority, or the index information of the frequency priority.

Optionally, the information indicates one or more of following:

whether a serving cell and/or a neighbor cell supports MR-DC;

slice(s) supported by the serving cell and/or the neighbor cell;

whether the serving cell and/or the neighbor cell supports a preset dedicated network;

type(s) of dedicated network(s) supported by the serving cell and/or the neighbor cell;

information on the frequency priority adopted by the UE.

In some implementations, the first determination module is further configured to:

in case that the frequency priority reason, or the information on whether to apply the frequency priority, or the information on the condition to apply the frequency priority, or the index information of the frequency priority denotes information on a frequency priority adopted by the UE, determine that a frequency priority corresponding to the information on the frequency priority adopted by the UE is the frequency priority to use in the cell reselection;

in case that the frequency priority reason or the information on the condition to apply the frequency priority denotes MR-DC, the information indicating that MR-DC is supported by the serving cell and/or the neighbor cell is received by the UE, and the UE supports the MR-DC, determine that a frequency priority corresponding to the MR-DC is the frequency priority to use in the cell reselection;

in case that the frequency priority reason or the information on the condition to apply the frequency priority denotes slice(s), the slice(s) supported by the serving cell and/or the neighbor cell is received by the UE, and the UE supports the slice(s) or is about to initiate a service related to the slice(s), determine that a frequency priority corresponding to the slice(s) is the frequency priority to use in the cell reselection;

in case that the frequency priority reason or the information on the condition to apply the frequency priority denotes a preset dedicated network, the information indicating that the preset dedicated network is supported by the serving cell and/or the neighbor cell is received by the UE or the type(s) of the dedicated network(s) supported by the serving cell and/or the neighbor cell is received by the UE, and the UE is in the preset dedicated network, determine that a frequency priority corresponding to the preset dedicated network is the frequency priority to use in the cell reselection;

in case that the frequency priority reason or the information on the condition to apply the frequency priority denotes load balancing or default, the slice(s) supported by the serving cell and/or the neighbor cell is received by the UE, and the UE does not support the slice(s), determine that a frequency priority corresponding to the load balancing or default is the frequency priority to use in the cell reselection;

in case that the frequency priority reason or the information on the condition to apply the frequency priority denotes the load balancing or default, the information indicating that MR-DC is supported by the serving cell and/or the neighbor cell is received by the UE, and the UE does not support the MR-DC, determine that the frequency priority corresponding to the load balancing or default is the frequency priority to use in the cell reselection;

in case that the frequency priority reason or the information on the condition to apply the frequency priority denotes the load balancing or default, and the information is not received by the UE, determine that the frequency priority corresponding to the load balancing or default is the frequency priority to use in the cell reselection.

In some implementations, the UE 400 further includes: a second determination module, configured to: in case that frequency priority activation information sent by the network device is received, determine the frequency priority to use in the cell reselection based on the frequency priority activation information and one of the following: the frequency priority reason, or the information on whether to apply the frequency priority, or the information on the condition to apply the frequency priority, or the index information of the frequency priority; in case that the frequency priority activation information sent by the network device is not received, use a default frequency priority as the frequency priority to use in the cell reselection.

In some implementations, the first receiving module 401 is further configured to: receive, from the network device, through a broadcast message or dedicated signaling, the frequency priority and one of the following: the frequency priority reason corresponding to the frequency priority, or the information on whether to apply the frequency priority, or the information on the condition to apply the frequency priority, or the index information of the frequency priority.

In some implementations, the UE 400 further includes: a second receiving module, configured to receive, from the network device, an effective duration of the frequency priority;

in case that a condition for determining that the frequency priority is the frequency priority to use in the cell reselection is not met, suspend the frequency priority before the effective duration of the frequency priority expires or before a new frequency priority is received.

In some implementations, the UE 400 further includes: a first sending module, configured to send capability information of the UE to the network device, wherein the capability information of the UE includes one or more of following:

information of slice(s) supported by the UE;

an MR-DC frequency band combination supported by the UE.

The UE according to some embodiments of the present disclosure may implement the foregoing embodiment as shown in FIG. 2, and has similar implementation principle and technical effects, which are not described redundantly herein.

Figure 5:
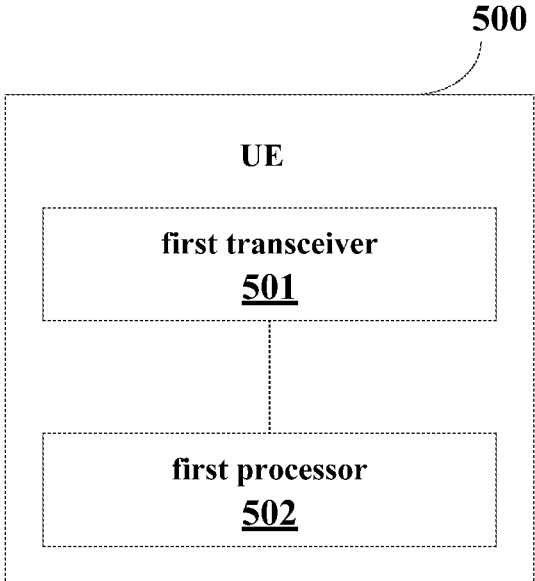
FIG. 5 is another schematic diagram of UE according to some embodiments of the present disclosure.

Referring to FIG. 5, some embodiments of the present disclosure further provide a UE. The UE 500 includes: a first transceiver 501 and a first processor 502;

wherein the first transceiver 501 is configured to receive, from a network device, a frequency priority and one of following: a frequency priority reason corresponding to the frequency priority, or information on whether to apply the frequency priority, or information on a condition to apply the frequency priority, or index information of the frequency priority;

wherein, the frequency priority and one of the following: the frequency priority reason, or the information on whether to apply the frequency priority, or the condition to apply the frequency priority, or the index information of the frequency priority are used for a cell reselection.

In some implementations, the first processor 502 is configured to determine a frequency priority to use in the cell reselection, based on capability information of the UE and/or information sent by the network device, and one of the following: the frequency priority reason, or the information on whether to apply the frequency priority, or the information on the condition to apply the frequency priority, or the index information of the frequency priority.

Optionally, the information indicates one or more of following:

whether a serving cell and/or a neighbor cell supports MR-DC;

slice(s) supported by the serving cell and/or the neighbor cell;

whether the serving cell and/or the neighbor cell supports a preset dedicated network;

type(s) of dedicated network(s) supported by the serving cell and/or the neighbor cell;

information on the frequency priority adopted by the UE.

In some implementations, the first determination module is further configured to:

in case that the frequency priority reason, or the information on whether to apply the frequency priority, or the information on the condition to apply the frequency priority, or the index information of the frequency priority denotes information on a frequency priority adopted by the UE, determine that a frequency priority corresponding to the information on the frequency priority adopted by the UE is the frequency priority to use in the cell reselection;

in case that the frequency priority reason or the information on the condition to apply the frequency priority denotes MR-DC, the information indicating that MR-DC is supported by the serving cell and/or the neighbor cell is received by the UE, and the UE supports the MR-DC, determine that a frequency priority corresponding to the MR-DC is the frequency priority to use in the cell reselection;

in case that the frequency priority reason or the information on the condition to apply the frequency priority denotes slice(s), the slice(s) supported by the serving cell and/or the neighbor cell is received by the UE, and the UE supports the slice(s) or is about to initiate a service related to the slice(s), determine that a frequency priority corresponding to the slice(s) is the frequency priority to use in the cell reselection;

in case that the frequency priority reason or the information on the condition to apply the frequency priority denotes a preset dedicated network, the information indicating that the preset dedicated network is supported by the serving cell and/or the neighbor cell is received by the UE or the type(s) of the dedicated network(s) supported by the serving cell and/or the neighbor cell is received by the UE, and the UE is in the preset dedicated network, determine that a frequency priority corresponding to the preset dedicated network is the frequency priority to use in the cell reselection;

in case that the frequency priority reason or the information on the condition to apply the frequency priority denotes load balancing or default, the slice(s) supported by the serving cell and/or the neighbor cell is received by the UE, and the UE does not support the slice(s), determine that a frequency priority corresponding to the load balancing or default is the frequency priority to use in the cell reselection;

in case that the frequency priority reason or the information on the condition to apply the frequency priority denotes the load balancing or default, the information indicating that MR-DC is supported by the serving cell and/or the neighbor cell is received by the UE, and the UE does not support the MR-DC, determine that the frequency priority corresponding to the load balancing or default is the frequency priority to use in the cell reselection;

in case that the frequency priority reason or the information on the condition to apply the frequency priority denotes the load balancing or default, and the information is not received by the UE, determine that the frequency priority corresponding to the load balancing or default is the frequency priority to use in the cell reselection.

In some implementations, the first processor 502 is configured to: in case that frequency priority activation information sent by the network device is received, determine the frequency priority to use in the cell reselection based on the frequency priority activation information and one of the following: the frequency priority reason, or the information on whether to apply the frequency priority, or the information on the condition to apply the frequency priority, or the index information of the frequency priority; in case that the frequency priority activation information sent by the network device is not received, use a default frequency priority as the frequency priority to use in the cell reselection.

In some implementations, the first transceiver 501 is further configured to: receive, from the network device, through a broadcast message or dedicated signaling, the frequency priority and one of the following: the frequency priority reason corresponding to the frequency priority, or the information on whether to apply the frequency priority, or the information on the condition to apply the frequency priority, or the index information of the frequency priority.

In some implementations, the first transceiver 501 is further configured to receive, from the network device, an effective duration of the frequency priority;

in case that a condition for determining that the frequency priority is the frequency priority to use in the cell reselection is not met, suspend the frequency priority before the effective duration of the frequency priority expires or before a new frequency priority is received.

In some implementations, the first transceiver 501 is further configured to send capability information of the UE to the network device, wherein the capability information of the UE includes one or more of following:

information of slice(s) supported by the UE;

an MR-DC frequency band combination supported by the UE.

The UE according to some embodiments of the present disclosure may implement the foregoing embodiment as shown in FIG. 2, and has similar implementation principle and technical effects, which are not described redundantly herein.

Figure 6:
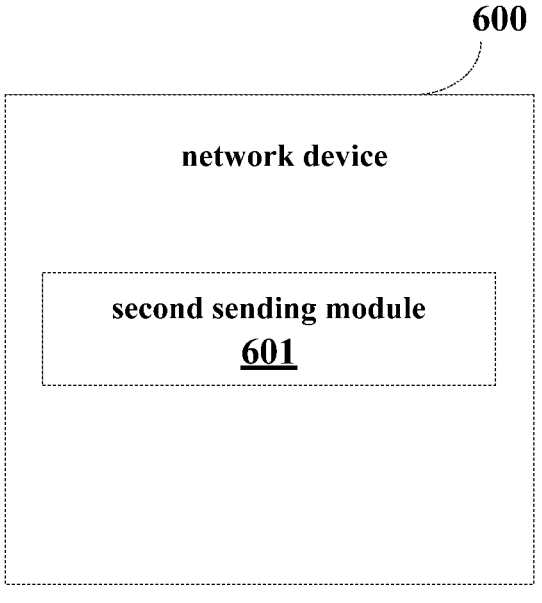
FIG. 6 is a schematic diagram of a network device according to some embodiments of the present disclosure.

Referring to FIG. 6, some embodiments of the present disclosure further provide a network device. The network device 600 includes:

a second sending module 601, configured to send, to a UE, a frequency priority and one of following: a frequency priority reason corresponding to the frequency priority, or information on whether to apply the frequency priority, or information on a condition to apply the frequency priority, or index information of the frequency priority;

wherein, the frequency priority and one of the following: the frequency priority reason, or the information on whether to apply the frequency priority, or the condition to apply the frequency priority, or the index information of the frequency priority are used for a cell reselection.

In some implementations, the second sending module 601 is further configured to: send, to the UE, through a broadcast message or dedicated signaling, the frequency priority and one of the following: the frequency priority reason corresponding to the frequency priority, or the information on whether to apply the frequency priority, or the information on the condition to apply the frequency priority, or the index information of the frequency priority.

The network device according to some embodiments of the present disclosure may implement the foregoing embodiment as shown in FIG. 3, and has similar implementation principle and technical effects, which are not described redundantly herein.

Figure 7:
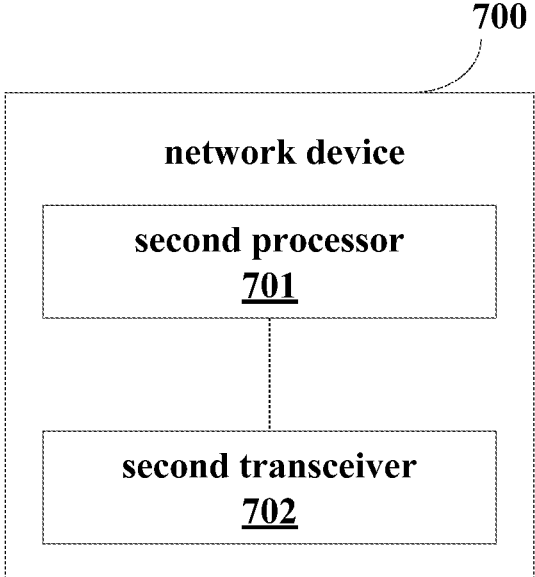
FIG. 7 is another schematic diagram of a network device according to some embodiments of the present disclosure.

Referring to FIG. 7, some embodiments of the present disclosure further provide a network device. The network device 700 includes: a second processor 701 and a second transceiver 702;

wherein the second processor 701 is configured to send, to a UE, a frequency priority and one of following: a frequency priority reason corresponding to the frequency priority, or information on whether to apply the frequency priority, or information on a condition to apply the frequency priority, or index information of the frequency priority;

wherein, the frequency priority and one of the following: the frequency priority reason, or the information on whether to apply the frequency priority, or the condition to apply the frequency priority, or the index information of the frequency priority are used for a cell reselection.

In some implementations, the second processor 701 is further configured to: send, to the UE, through a broadcast message or dedicated signaling, the frequency priority and one of the following: the frequency priority reason corresponding to the frequency priority, or the information on whether to apply the frequency priority, or the information on the condition to apply the frequency priority, or the index information of the frequency priority.

The network device according to some embodiments of the present disclosure may implement the foregoing embodiment as shown in FIG. 3, and has similar implementation principle and technical effects, which are not described redundantly herein.

Figure 8:
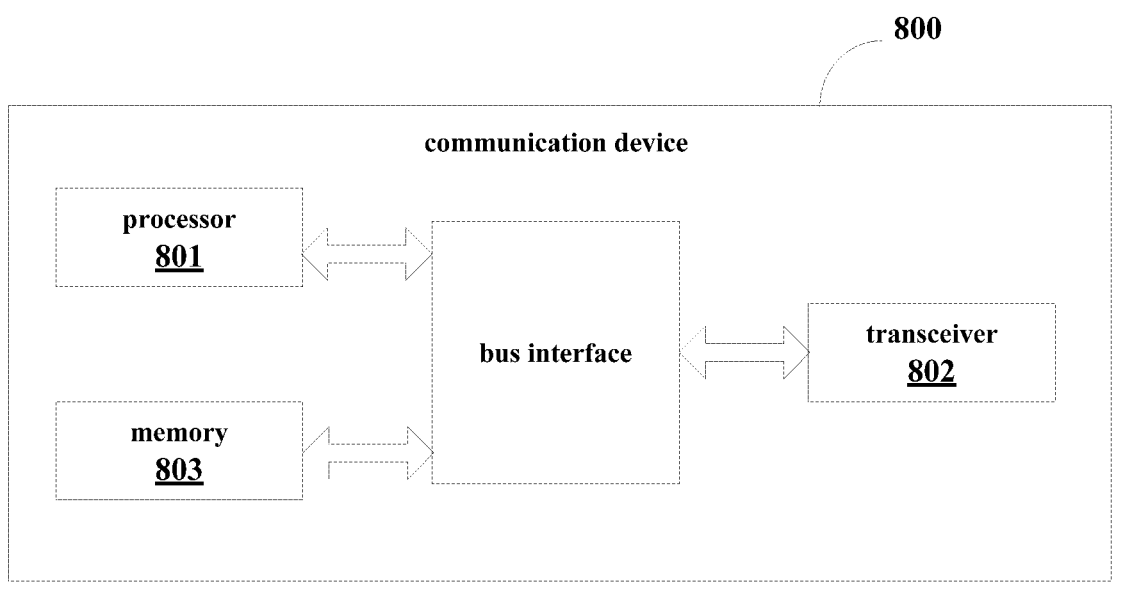
FIG. 8 is a schematic diagram of a communication device according to some embodiments of the present disclosure.

Referring to FIG. 8, a structural diagram of a communication device to which some embodiments of the present disclosure are applied is illustrated. As shown in FIG. 8, the communication device 800 includes: a processor 801, a transceiver 802, a memory 803 and a bus interface. The processor 801 may be responsible for supervising the bus architecture and normal operation. The memory 803 may store data being used by the processor 801 during operation.

In an embodiment of the present disclosure, the communication device 800 further includes a computer program stored in the memory 803 and executable by the processor 801. When the computer program is executed by the processor 801, steps of the method as shown in FIG. 2 or FIG. 3 are implemented.

In FIG. 8, a bus architecture may include any number of interconnected buses and bridges, and connects various circuits including one or more processors represented by the processor 801 and memory represented by the memory 803. The bus architecture may also connect various other circuits such as peripherals, voltage regulators and power management circuits, which is well known in the art. Therefore, a detailed description thereof is omitted herein. A bus interface provides interfaces. The transceiver 802 may be multiple elements, that is, including a transmitter and a receiver, to provide a unit for communication with various other apparatuses on the transmission medium.

The communication device according to some embodiments of the present disclosure may implement the method embodiment as shown in FIG. 2 or FIG. 3, and has similar implementation principle and technical effects, which are not described redundantly herein.

The steps of the method or algorithm described in the present disclosure may be implemented in form of hardware, or implemented in form of a software instruction executable by a processor. The software instruction may be composed of corresponding software modules, and the software modules may be stored in a Random Access Memory (RAM), flash memory, Read-Only Memory (ROM), Erasable Programmable ROM (EPROM), Electrically Erasable Programmable ROM (EEPROM), register, hard disk, removable hard disk, read-only optical disc or any other form of storage medium well known in the art. An exemplary storage medium is coupled to a processor, so that the processor may read information from the storage medium and write information to storage medium. Certainly, the storage medium may be a part of the processor. The processor and the storage medium may reside in an Application Specific Integrated Circuit (ASIC). In addition, the ASIC may reside in a core network interface device. Certainly, the processor and the storage medium may also reside in the core network interface device as discrete components.

Persons skilled in the art would appreciate that, in the foregoing one or more examples, the functions described by the present disclosure may be implemented with hardware, software, firmware or any combination thereof. When being implemented with software, these functions may be stored in a computer readable medium or transmitted as one or more instructions or codes in a computer readable medium. The computer readable medium includes a computer storage medium and a communication medium. The communication medium includes any medium facilitating the transmission of a computer program from one place to another. The storage medium may be any available medium accessible by a general purpose computer or a special purpose computer.

The foregoing specific implementations further describe in detail the purpose, technical solution and beneficial effects of the present disclosure. It is understood, the above descriptions are merely specific implementations of the present disclosure, and are not intended to define the scope of the present disclosure. Any modifications, equivalent replacements or improvements made on the basis of the technical solution of the present disclosure shall fall within the scope of the present disclosure.

It is appreciated by a person skilled in the art that, embodiments of the present disclosure may be implemented as a method, system or computer program product. Therefore, embodiments of the present disclosure may take the form of a complete hardware embodiment, complete software embodiment or combination of hardware and software. Moreover, embodiments of the present disclosure may take the form of a computer program product embodied as one or more computer usable storage media (including, but not limited to, a magnetic disk storage, Compact Disc Read-Only Memory (CD-ROM), optical storage or the like) storing therein computer usable program codes.

It may be understood that these embodiments described in this disclosure may be implemented by hardware, software, firmware, middleware, microcode or a combination thereof. For hardware implementation, a module, unit, sub-module, sub-unit may be implemented in one or more ASICs, a Digital Signal Processor (DSP), a Digital Signal Processing Device (DSP device, DSPD), a Programmable Logic Device (PLD), a Field-Programmable Gate Array (FPGA), a general-purpose processor, a controller, a microcontroller, a microprocessor, other electronic unit configured to perform the functions in the present disclosure or a combination thereof.

The embodiments of the present disclosure have been described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which are executed via the processor of the computer or other programmable data processing terminal device, create means for implementing the functions specified in one or more flows of the flow diagram and/or one or more blocks of the block diagram.

These computer program instructions may also be stored in a computer-readable storage that can direct a computer or other programmable data processing terminal device to function in a particular manner, such that the instructions stored in the computer-readable storage produce an article of manufacture including instruction means which implement the function specified in one or more flows of the flow diagram and/or one or more blocks of the block diagram.

The computer program instructions may also be loaded onto a computer or other programmable data processing device to cause a series of operational steps to be performed on the computer or other programmable device to produce a computer-implemented process, such that the instructions which are executed on the computer or other programmable device provide steps for implementing the functions specified in one or more flows of the flow diagram and/or one or more blocks of the block diagram.

Obviously, modifications and variants of the embodiments of the present disclosure may be made by a person of ordinary skill in the art without departing from the principle of the present disclosure. Thus, if these modifications and variants of the embodiments of the present disclosure fall within the scope of the claims and their equivalents, the present disclosure is intended to encompass these modifications and variants.

What is claimed is:

1. A cell reselection method, which is performed by a User Equipment (UE), the cell reselection method comprising:
   receiving, from a network device, a frequency priority and one of following: a frequency priority reason corresponding to the frequency priority, or information on whether to apply the frequency priority, or information on a condition to apply the frequency priority;
   wherein the frequency priority and one of the following: the frequency priority reason, or the information on whether to apply the frequency priority, or the condition to apply the frequency priority are used for a cell reselection,
   wherein the cell reselection method further comprises:
   determining which frequency priority among configured multiple frequency priorities to use in the cell reselection, based on (i) capability information of the UE, or capability information of the UE and information sent by the network device, and (ii) one of the following: the frequency priority reason, or the information on whether to apply the frequency priority, or the information on the condition to apply the frequency priority.

2. The cell reselection method according to claim 1, wherein the information indicates one or more of following:
   whether a serving cell or a neighbor cell supports Multi-Radio access technology Dual Connectivity (MR-DC);
   slice(s) supported by the serving cell or the neighbor cell;
   whether the serving cell or the neighbor cell supports a preset dedicated network;
   type(s) of dedicated network(s) supported by the serving cell or the neighbor cell.

3. The cell reselection method according to claim 2, wherein the determining the frequency priority to use in the cell reselection, based on the capability information of the UE or the capability information of the UE and the information sent by the network device, and one of the following: the frequency priority reason, or the information on whether to apply the frequency priority, or the information on the condition to apply the frequency priority, or the index information of the frequency priority comprises one or more of following:

in case that the frequency priority reason, or the information on whether to apply the frequency priority, or the information on the condition to apply the frequency priority, or the index information of the frequency priority denotes information on a frequency priority adopted by the UE, determining that a frequency priority corresponding to the information on the frequency priority adopted by the UE is the frequency priority to use in the cell reselection;

in case that the frequency priority reason or the information on the condition to apply the frequency priority denotes MR-DC, the information indicating that MR-DC is supported by the serving cell or the neighbor cell is received by the UE, and the UE supports the MR-DC, determining that a frequency priority corresponding to the MR-DC is the frequency priority to use in the cell reselection;

in case that the frequency priority reason or the information on the condition to apply the frequency priority denotes slice(s), the slice(s) supported by the serving cell or the neighbor cell is received by the UE, and the UE supports the slice(s) or is about to initiate a service related to the slice(s), determining that a frequency priority corresponding to the slice(s) is the frequency priority to use in the cell reselection;

in case that the frequency priority reason or the information on the condition to apply the frequency priority denotes a preset dedicated network, the information indicating that the preset dedicated network is supported by the serving cell or the neighbor cell is received by the UE or the type(s) of the dedicated network(s) supported by the serving cell or the neighbor cell is received by the UE, and the UE is in the preset dedicated network, determining that a frequency priority corresponding to the preset dedicated network is the frequency priority to use in the cell reselection;

in case that the frequency priority reason or the information on the condition to apply the frequency priority denotes load balancing or default, the slice(s) supported by the serving cell or the neighbor cell is received by the UE, and the UE does not support the slice(s), determining that a frequency priority corresponding to the load balancing or default is the frequency priority to use in the cell reselection;

in case that the frequency priority reason or the information on the condition to apply the frequency priority denotes the load balancing or default, the information indicating that MR-DC is supported by the serving cell or the neighbor cell is received by the UE, and the UE does not support the MR-DC, determining that the frequency priority corresponding to the load balancing or default is the frequency priority to use in the cell reselection;

in case that the frequency priority reason or the information on the condition to apply the frequency priority denotes the load balancing or default, and the information is not received by the UE, determining that the frequency priority corresponding to the load balancing or default is the frequency priority to use in the cell reselection.

4. The cell reselection method according to claim 1, further comprising:

in case that frequency priority activation information sent by the network device is received, determining the frequency priority to use in the cell reselection based on the frequency priority activation information and one of the following: the frequency priority reason, or the information on whether to apply the frequency priority, or the information on the condition to apply the frequency priority, or the index information of the frequency priority;

in case that the frequency priority activation information sent by the network device is not received, using a default frequency priority as the frequency priority to use in the cell reselection.

5. The cell reselection method according to claim 1, wherein the receiving, from the network device, the frequency priority and one of the following: the frequency priority reason corresponding to the frequency priority, or the information on whether to apply the frequency priority, or the information on the condition to apply the frequency priority, or the index information of the frequency priority comprises:

receiving, from the network device, through a broadcast message or dedicated signaling, the frequency priority and one of the following: the frequency priority reason corresponding to the frequency priority, or the information on whether to apply the frequency priority, or the information on the condition to apply the frequency priority, or the index information of the frequency priority.

6. The cell reselection method according to claim 1, further comprising:

receiving, from the network device, an effective duration of the frequency priority;

in case that a condition for determining that the frequency priority is the frequency priority to use in the cell reselection is not met, suspending the frequency priority before the effective duration of the frequency priority expires or before a new frequency priority is received.

7. The cell reselection method according to claim 1, further comprising:

sending capability information of the UE to the network device, wherein the capability information of the UE comprises one or more of following:

information of slice(s) supported by the UE;

an MR-DC frequency band combination supported by the UE.

8. A cell reselection method, which is performed by a network device, the cell reselection method comprising:

sending, to a User Equipment (UE), a frequency priority and one of following: a frequency priority reason corresponding to the frequency priority, or information on whether to apply the frequency priority, or information on a condition to apply the frequency priority;

wherein the frequency priority and one of the following: the frequency priority reason, or the information on whether to apply the frequency priority, or the condition to apply the frequency priority are used for a cell reselection, wherein which frequency priority among configured multiple frequency priorities to use in the cell reselection is determined, based on (i) capability information of the UE, or capability information of the UE and information sent by the network device, and (ii) one of the following: the frequency priority reason, or the information on whether to apply the frequency priority, or the information on the condition to apply the frequency priority.

9. The cell reselection method according to claim 8, wherein the sending, to the UE, the frequency priority and one of the following: the frequency priority reason corresponding to the frequency priority, or the information on whether to apply the frequency priority, or the information on the condition to apply the frequency priority, or the index information of the frequency priority comprises:

sending, to the UE, through a broadcast message or dedicated signaling, the frequency priority and one of the following: the frequency priority reason corresponding to the frequency priority, or the information on whether to apply the frequency priority, or the information on the condition to apply the frequency priority, or the index information of the frequency priority.

10. A User Equipment (UE), comprising: a first transceiver and a first processor, wherein the first transceiver is configured to receive, from a network device, a frequency priority and one of following: a frequency priority reason corresponding to the frequency priority, or information on whether to apply the frequency priority, or information on a condition to apply the frequency priority;

wherein the frequency priority and one of the following: the frequency priority reason, or the information on whether to apply the frequency priority, or the condition to apply the frequency priority are used for a cell reselection, wherein the first processor is configured to:

determine which frequency priority among configured multiple frequency priorities to use in the cell reselection, based on (i) capability information of the UE, or capability information of the UE and information sent by the network device, and (ii) one of the following: the frequency priority reason, or the information on whether to apply the frequency priority, or the information on the condition to apply the frequency priority.

11. A network device, comprising: a second processor, a second memory storing thereon a computer program, and a second transceiver, wherein the computer program is configured to be executed by the second processor, to enable the second transceiver to implement steps of the cell reselection method according to claim 8, the cell reselection method comprising:

sending, to a User Equipment (UE), a frequency priority and one of following: a frequency priority reason corresponding to the frequency priority, or information on whether to apply the frequency priority, or information on a condition to apply the frequency priority;

wherein the frequency priority and one of the following: the frequency priority reason, or the information on whether to apply the frequency priority, or the condition to apply the frequency priority are used for a cell reselection, wherein which frequency priority among configured multiple frequency priorities to use in the cell reselection is determined, based on (i) capability information of the UE, or capability information of the UE and information sent by the network device, and (ii) one of the following: the frequency priority reason, or the information on whether to apply the frequency priority, or the information on the condition to apply the frequency priority.

12. The UE according to claim 10, wherein the information indicates one or more of following:

whether a serving cell or a neighbor cell supports Multi-Radio access technology Dual Connectivity (MR-DC);

slice(s) supported by the serving cell or the neighbor cell;

whether the serving cell or the neighbor cell supports a preset dedicated network;

type(s) of dedicated network(s) supported by the serving cell or the neighbor cell.

13. The UE according to claim 12, wherein the determining the frequency priority to use in the cell reselection, based on the capability information of the UE or the capability information of the UE and the information sent by the network device, and one of the following: the frequency priority reason, or the information on whether to apply the frequency priority, or the information on the condition to apply the frequency priority, or the index information of the frequency priority comprises one or more of following:

in case that the frequency priority reason, or the information on whether to apply the frequency priority, or the information on the condition to apply the frequency priority, or the index information of the frequency priority denotes information on a frequency priority adopted by the UE, determining that a frequency priority corresponding to the information on the frequency priority adopted by the UE is the frequency priority to use in the cell reselection;

in case that the frequency priority reason or the information on the condition to apply the frequency priority denotes MR-DC, the information indicating that MR-DC is supported by the serving cell or the neighbor cell is received by the UE, and the UE supports the MR-DC, determining that a frequency priority corresponding to the MR-DC is the frequency priority to use in the cell reselection;

in case that the frequency priority reason or the information on the condition to apply the frequency priority denotes slice(s), the slice(s) supported by the serving cell or the neighbor cell is received by the UE, and the UE supports the slice(s) or is about to initiate a service related to the slice(s), determining that a frequency priority corresponding to the slice(s) is the frequency priority to use in the cell reselection;

in case that the frequency priority reason or the information on the condition to apply the frequency priority denotes a preset dedicated network, the information indicating that the preset dedicated network is supported by the serving cell or the neighbor cell is received by the UE or the type(s) of the dedicated network(s) supported by the serving cell or the neighbor cell is received by the UE, and the UE is in the preset dedicated network, determining that a frequency priority corresponding to the preset dedicated network is the frequency priority to use in the cell reselection;

in case that the frequency priority reason or the information on the condition to apply the frequency priority denotes load balancing or default, the slice(s) supported by the serving cell or the neighbor cell is received by the UE, and the UE does not support the slice(s), determining that a frequency priority corresponding to the load balancing or default is the frequency priority to use in the cell reselection;

in case that the frequency priority reason or the information on the condition to apply the frequency priority denotes the load balancing or default, the information indicating that MR-DC is supported by the serving cell or the neighbor cell is received by the UE, and the UE does not support the MR-DC, determining that the frequency priority corresponding to the load balancing or default is the frequency priority to use in the cell reselection;

in case that the frequency priority reason or the information on the condition to apply the frequency priority denotes the load balancing or default, and the information is not received by the UE, determining that the frequency priority corresponding to the load balancing or default is the frequency priority to use in the cell reselection.

14. The UE according to claim 10, wherein the first processor is further configured to:

in case that frequency priority activation information sent by the network device is received, determine the frequency priority to use in the cell reselection based on the frequency priority activation information and one of the following: the frequency priority reason, or the information on whether to apply the frequency priority, or the information on the condition to apply the frequency priority, or the index information of the frequency priority;

in case that the frequency priority activation information sent by the network device is not received, use a default frequency priority as the frequency priority to use in the cell reselection.

15. The UE according to claim 10, wherein the receiving, from the network device, the frequency priority and one of the following: the frequency priority reason corresponding to the frequency priority, or the information on whether to apply the frequency priority, or the information on the condition to apply the frequency priority, or the index information of the frequency priority comprises:

receiving, from the network device, through a broadcast message or dedicated signaling, the frequency priority and one of the following: the frequency priority reason corresponding to the frequency priority, or the information on whether to apply the frequency priority, or the information on the condition to apply the frequency priority, or the index information of the frequency priority.

16. The UE according to claim 10, wherein the first processor is further configured to:

receive, from the network device, an effective duration of the frequency priority;

in case that a condition for determining that the frequency priority is the frequency priority to use in the cell reselection is not met, suspend the frequency priority before the effective duration of the frequency priority expires or before a new frequency priority is received.

17. The UE according to claim 10, wherein the first processor is further configured to:

send capability information of the UE to the network device, wherein the capability information of the UE comprises one or more of following:

information of slice(s) supported by the UE;

an MR-DC frequency band combination supported by the UE.

18. The network device according to claim 11, wherein the sending, to the UE, the frequency priority and one of the following: the frequency priority reason corresponding to the frequency priority, or the information on whether to apply the frequency priority, or the information on the condition to apply the frequency priority, or the index information of the frequency priority comprises:

sending, to the UE, through a broadcast message or dedicated signaling, the frequency priority and one of the following: the frequency priority reason corresponding to the frequency priority, or the information on whether to apply the frequency priority, or the information on the condition to apply the frequency priority, or the index information of the frequency priority.

19. The cell reselection method according to claim 2, wherein the slice(s) supported by the serving cell or the neighbor cell comprise(s) Ultra Reliable & Low Latency Communication (URLLC) slice(s) supported by 4.9 GHZ, or enhanced Mobile Broad Band (eMBB) slice(s) supported by 2.6 GHz.

* * * * *